(12) United States Patent
Lay

(10) Patent No.: US 6,812,859 B2
(45) Date of Patent: Nov. 2, 2004

(54) ANTI-HIJACK SYSTEM AND METHOD IN A MODE OF FORESTALLING THE ENEMY

(76) Inventor: Tian-Fa Lay, No. 35, San Chong Lane, San Chong Li, Zhu San Zhen, Nantou (TW)

( * ) Notice: Subject to any disclaimer, the term of this patent is extended or adjusted under 35 U.S.C. 154(b) by 30 days.

(21) Appl. No.: 10/308,086

(22) Filed: Dec. 3, 2002

(65) Prior Publication Data

US 2003/0117286 A1 Jun. 26, 2003

(30) Foreign Application Priority Data

Dec. 10, 2001 (TW) ........................................ 90130560 A

(51) Int. Cl.[7] .............................................. G08B 21/00
(52) U.S. Cl. .................. 340/945; 340/963; 340/426.11; 340/426.12
(58) Field of Search ................................ 340/945, 963, 340/426.12, 426.15, 426.11; 348/123, 143; 244/118.5, 118.6

(56) References Cited

U.S. PATENT DOCUMENTS 4,644,845 A * 2/1987 Garehime, Jr. ............. 89/41.05
6,499,693 B1 * 12/2002 Rogson ................... 344/118.5
6,641,088 B2 * 11/2003 Suchar ..................... 244/118.5
6,696,928 B1 * 2/2004 Boveja et al. ......... 340/426.12

FOREIGN PATENT DOCUMENTS

FR             2830841 A1 *  4/2003   .......... B64D/25/00

* cited by examiner

Primary Examiner—Toan N. Pham
(74) Attorney, Agent, or Firm—Dennison, Schultz, Dougherty & MacDonald

(57) ABSTRACT

An anti-hijack system and an anti-hijack method in a mode of forestalling the enemy, the system includes a plurality of alarm devices, a displayer, a signal recorder, a magnetic spring lock and a security device. Wherein each alarm device includes switches provided on every of the chairs in the passenger cabin; the alarm device is connected to the displayer and the signal recorder provided in the cockpit; the magnetic spring lock is provided on the cabin door of the cockpit; the security device is a supply system of paralyzing gas and air (non oxygen) isolatable from the paralyzing gas, the outlets of the paralyzing gas are distributed all over the passenger cabin. During flight, if the passengers find that hijackers want to or start to act, they can activate the alarm devices immediately to notice the persons in the cockpit directly, the persons in the cockpit can rapidly activate the security device to act against the hijackers. In this way, the event of hijacking can be rapidly eliminated before it gets worse.

18 Claims, 3 Drawing Sheets

ANTI-HIJACK SYSTEM AND METHOD IN A MODE OF FORESTALLING THE ENEMY

BACKGROUND OF THE INVENTION

1. Field of the Invention

The present invention is related to an anti-hijack system and an anti-hijack method in a mode of forestalling the enemy, and especially to such a system and such a method applicable to a vehicle such as an airplane or the like to separate the pilot from the passengers.

2. Description of the Prior Art

The reason why hijacks have been frequently made is that hijackers got the idea that people worry about the safety of passengers and crews and have to compromise with them. No matter the event is large or small, no matter the time spent for the event is long or short, the final result must make the society pay a large cost. Especially in the case of the 911-event at the World Trade center in the U.S.A., the disaster was terribly sad, it influenced all countries around the world. We can see the scoundrels have deeply been planted with the value concepts that are worth death, and negotiation will no more be a good way to deal with a hijack; this largely threaten the safety of flight and development of international economy.

As a result, the air traffic prosperously developing day by day and being convenient for all the people originally makes people afraid of suddenly; and we can feel the moods of those who cannot help taking a flight. These render those related businesses (such as the airplane manufacturing art, airline companies, travel agents etc.), passengers, people relating to those buildings subjected to being targets and the people nearby them horrified and thus hard to get along all the time. However nowadays, all nations do not have a good way to deal with hijacks except blaming and condemning, and can only hope to make a more perfect examination before boarding a plane by searching and not to neglect even a knife. In facing to such cunning hijackers notwithstanding, the hijackers can still do something even when they board unarmed. It can be expected that, ground safety examination systems and methods from now on will be not adequate for the scoundrels who mean to crime, such crimes are out of the capability of prevention.

The inventor of the present invention analyzed the past hijacks, and thought that dealings of the hijacks formerly are hard studies in contest, negotiation and fighting against etc. after hijackers succeeded with controlling the entire state (kidnapping hostages), these are evidently deficient in lacking of the feature of forestalling the enemy.

In view that the conventional method stated above has the above mentioned defects, the inventor of the present invention studied and developed an anti-hijack system and an anti-hijack method in a mode of forestalling the enemy, thereby during hijacking, passengers who can only be hostages at the mercy of hijackers can have the advantage of having many watching persons who are most close to the hijackers, thereby can be the roles of watchers on the safety of the passenger cabin. They can rapidly advise the pilots in the cockpit to take an action at the earliest moment in order that the event of hijacking can be solved before it gets worse, and this is the motive of the present invention.

SUMMARY OF THE INVENTION

The primary object of the present invention is to provide an anti-hijack system and an anti-hijack method in a mode of forestalling the enemy to solve the event of hijacking before it gets worse.

The secondary object of the present invention is to provide an anti-hijack system and an anti-hijack method in a mode of forestalling the enemy, whereby every passenger can give an alarm signal to advise the pilots in the cockpit to take a suitable action at the earliest moment.

In order to achieve the above stated objects, the present invention includes an alarm system including a plurality of alarm devices, a displayer, a signal recorder, a magnetic spring lock and a security device. Wherein the alarm devices each includes a plurality of switches provided on every of the chairs in the passenger cabin (including other activity spaces such as the kitchen, water closets, baggage compartment . . . ); the signal lines of the switches are connected to the displayer and the signal recorder provided in the cockpit; the magnetic spring lock is provided on the cabin door of the cockpit; the security device is a normal paralyzing gas controller, the outlets of the paralyzing gas are distributed all over the cabin; and the security device is controlled by the persons in the cockpit. If there is a case of hijack, every passenger can singly or simultaneously activate the alarm system, the signals emitted from the alarm system will be received by the signal recorder to have the chair numbers encoded, and then are sent to the displayer. The displayer will display the positions where passengers activate the alarm system, and the number of persons and the areas giving the alarms can be known. When the persons in the cockpit get the alarm signals, the crews in the cabin can immediately be noticed to wear the oxygen masks and eyeguards for self-protection, then the persons in the cockpit can rapidly activate the security device to spray the paralyzing gas out of the outlets. Thereby, in an extremely short time period, all the persons in the cabins will be paralyzed by absorbing the paralyzing gas except those crews wearing the oxygen masks and eyeguards. Now the security personnel can arrest in the first place the hijackers having revealed their own, then revive the persons giving alarms and the rest persons, and ask the alarm makers to assist to recognize those hijackers not certainly recognized. In this way, the event of hijacking can be solved before it gets worse, and no unnecessary sacrifice is paid.

The present invention will be apparent in its technical contents, features and effects after reading the detailed description of the preferred embodiment thereof in reference to the accompanying drawings.

DETAILED DESCRIPTION OF THE PREFERRED EMBODIMENT

Figure 1:
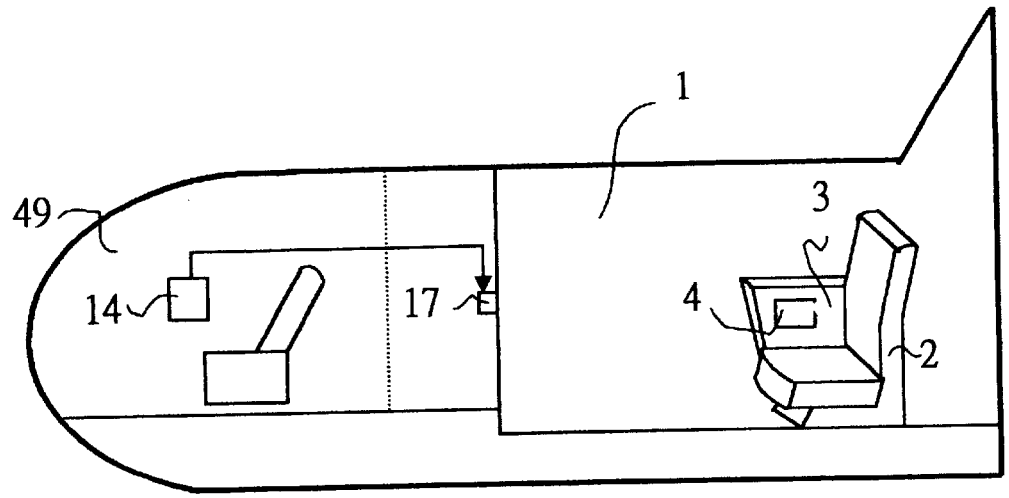
FIG. 1 is a schematic view showing the present invention installing in cabins of an airplane.
Figure 1B:
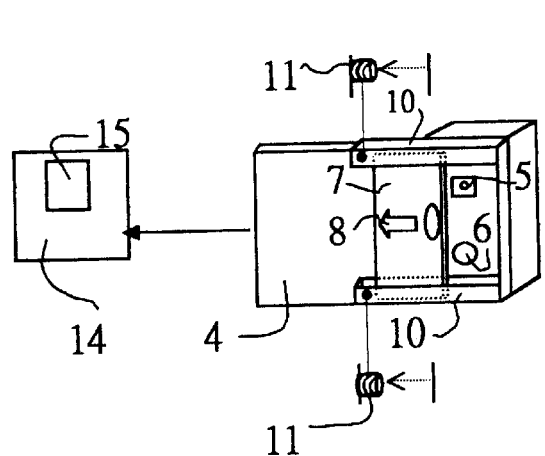
FIG. 1b is a perspective schematic view showing the opening state of an alarm device of the present invention.
Figure 1A:
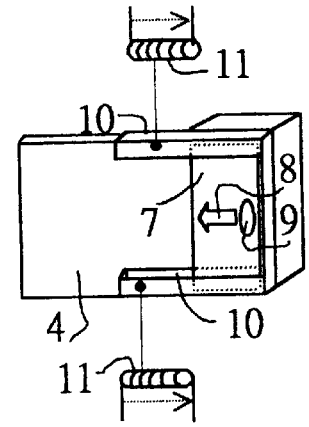
FIG. 1a is a perspective schematic view showing the closing state of an alarm device of the present invention.

The present invention is comprised mainly of an alarm system including a plurality of alarm devices 4, a displayer 15, a signal recorder 14, a magnetic spring lock 17 and a security device 23. Referring firstly to FIG. 1, an airplane can be divided into a front section which is a cockpit 49 and a rear section which is a passenger cabin 1, the cockpit 49 and the passenger cabin 1 are both provided with chairs 2 for seating, a box of each alarm device 4 is mounted on one of the armrests 3 of each chair 2 in the passenger cabin 1, the box is provided therein with a photosensitive switch 5 and a snap switch 6, and is provided respectively on the upper and the lower sides thereof with a cannel 10 which has a spring 11 therein to allow a protective cover 7 to be pushed therein to prevent the photosensitive switch 5 and the snap switch 6 from accidental pressing. The protective cover 7 is further provided with a direction indicating mark 8 and a concaved surficial area 9 for pressing by a finger (referring simultaneously to FIGS. 1a and 1b). The signals from the photosensitive switch 5 and the snap switch 6 are transmitted to the signal recorder 14 in the cockpit 49; the signal recorder 14 is connected with the displayer 15 (as shown in FIG. 1c) and the magnetic spring lock 17 which is provided in the cabin door of the cockpit 49.

Figure 2:
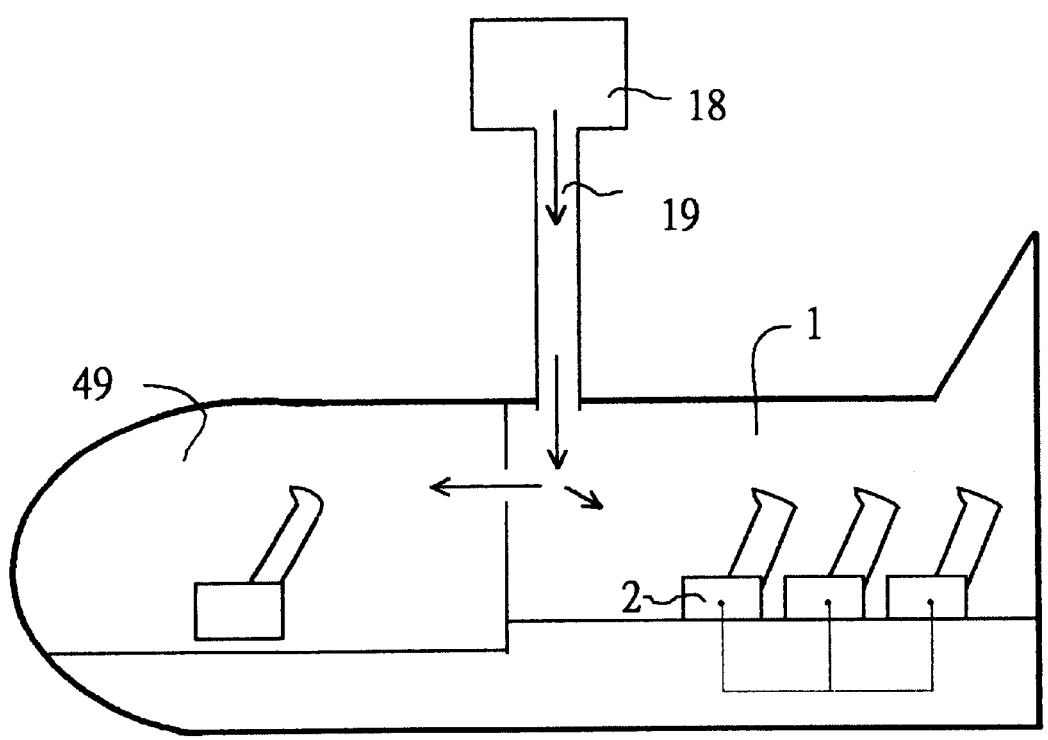
FIG. 2 is a schematic view showing air supplying of an airplane in a normal way.
Figure 3:
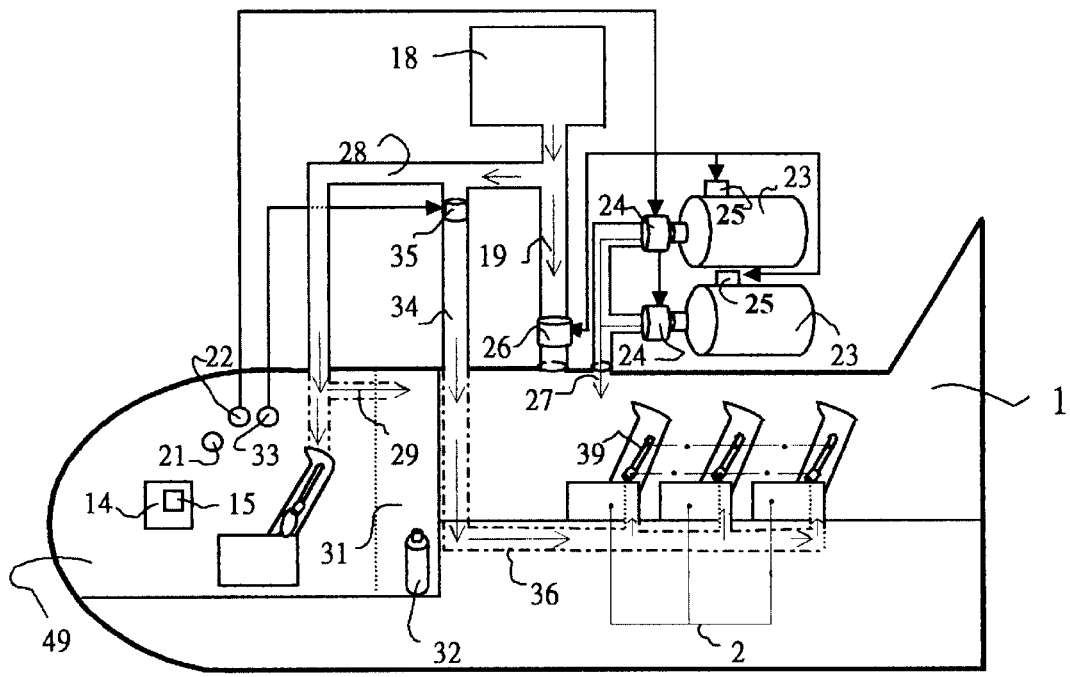
FIG. 3 is a schematic view showing a complete distributing diagram of pipe lines in the cabins.

Referring to FIG. 2, generally, an airplane used presently has its passenger cabin 1 and cockpit 49 arranged to use a common air supply 18 and a common delivery pipe 19; please also refer to FIG. 3, when in using the present invention, the delivery pipe 19 is provided on the outlet thereof with a switch 26, the delivery pipe 19 is further provided on the top thereof with a cockpit manifold 28 to led air into the cockpit 49. And the cockpit manifold 28 is provided on the front end and the rear end thereof respectively with a passenger-cabin manifold 34 and a ready-service room manifold 29. The passenger-cabin manifold 34 is provided on the upper end thereof with a manifold switch 35 of which a control push-button 33 is provided in the cockpit 49. The ready-service room 31 is provided therein with back-carrying type oxygen bottles 32.

The security device 23 is a container with a space, the container can be loaded therein with paralyzing gas or tear gas, and is provided therein with a pressurizer 25. The outlet of the container is provided with a pipe, an outlet 27 of the pipe is communicated with the passenger cabin 1; the pipe and the container have therebetween a switch 24 of which a control push-button 22 is provided in the cockpit 49, the cockpit 49 is further provided with an alarm push-button 21 to inform all the personnel in the cockpit 49.

Figure 3C:
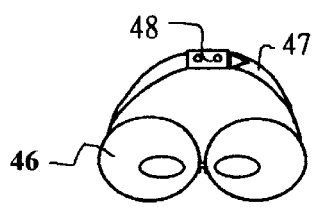
FIG. 3c is a perspective view showing the appearance of an eyeguard.
Figure 3B:
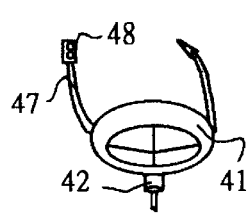
FIG. 3b is a perspective view showing the appearance of an oxygen mask.
Figure 3A:
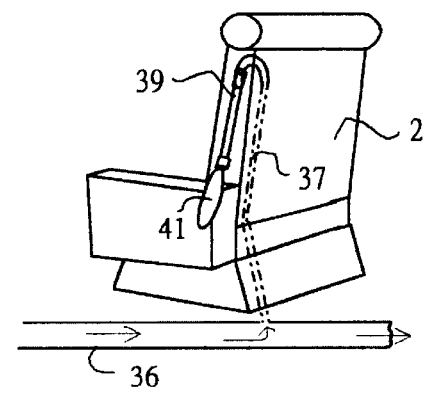
FIG. 3a is a perspective schematic view showing air supplying for an individual chair.

Referring to FIG. 3a, each chair 2 is provided therein with a chair-back manifold 37 of which the bottom end is connected with a hidden pipe line network 36, The pipe line network 36 is in turn connected with the passenger-cabin manifold 34, the upper end of the chair-back manifold 37 is connected with a hose 39 of which the other end is provided therein with a valve leaf to prevent air accessing, the valve leaf is forced to open by a connector 42 of an oxygen mask 41, and an eyeguard 46 is attached here, which eyeguard 46 is not light transmissible. As shown in FIGS. 3b and 3c, the oxygen mask 41 and the eyeguard 46 are provided on the lateral sides thereof respectively with tying belts 47 of which the tailing ends are provided each with an adjustment button 48 for adjustment of the tightness of wearing.

With the above stated combination, during flight, if hijackers want to or start to act, but they are limited in number, and are unable to control all the passengers at the beginning, now the passengers can take advantage of their plurality and closeness to the hijackers, they can individually or simultaneously push away the protective covers 7 on the alarm devices 4 provided on one of their armrests 3; by virtue that the actions of pushing away the protective covers 7 are very slight, the passengers can do this without showing any evident action, thus can avoid irritating the hijackers and avoid immediate avenging of the hijackers. The photosensitive switch 5 is activated by light in order to prevent the photosensitive switch 5 from being out of work; the photosensitive switch 5 is provided beside it with the snap switch 6 capable of being activated by displacement of the protective cover 7 to transmit signals to the signal recorder 14 and the displayer 15 of the cockpit 49 to make an alarm for the pilots, the signal recorder 14 also drives the magnetic spring lock 17 to lock the cabin door of the cockpit 49 to prevent hijackers from intruding.

When the pilots obtain alarm signals on the displayer 15, they can show the situation through the alarm push-button 21 to the personnel in the cockpit 49, the personnel can immediately wear eyeguards 46 and oxygen masks 41 for self-protection, and can individually obtain air supplying by the oxygen masks 41 through the cockpit manifold 28 and the ready-service room manifold 29. And the switch 24 as well as the pressurizer 25 of the security device 23 can be activated without noticing in advance, the switch 26 of the delivery pipe 19 in the air supply 18 can be shut down to allow paralyzing gas to enter the passenger cabin 1 through the outlet 27. By the fact that the airplane is a tightly sealed space, persons at any corner of the cabins will be forced to absorb or contact the paralyzing gas to be paralyzed. After a period of time, when it is sure that the paralyzing gas works, the security personnel in the cockpit 49 can wear the back-carrying type oxygen bottles 32 with the information of the chair numbers encoded in the signal recorder 14 carried on their own persons to be ready to arrest the hijackers.

At this time, the pilots can activate the manifold switch 35 of the passenger-cabin manifold 34 by mans of the control push-button 33 in order to deliver the air in the air supply 18 from the passenger-cabin manifold 34 into the hidden pipe line network 36, then through the chair-back manifolds 37 and the hoses 39 to thereby form another independent air supplying system. The paralyzing gas is separated from air; the security personnel then put the oxygen masks 41 and the eyeguards 46 on the persons giving alarms and the weak old people and children to revive the persons giving alarms in order to recognize the hijackers. After arrestment, the security personnel sequentially help the rest passengers to put on the oxygen masks 41 and the eyeguards 46 to revive them.

Even if some hijackers are not arrested, by virtue that the paralyzing gas includes tear gas; and the hijackers not arrested have to wear the eyeguards 46 which are not light transmissible, their eye sights are obscured, thereby they can not find the objects with their eyes; besides, the hoses 39 are limited by length, users must use them at the chairs respectively, this can restrain the hijackers not arrested from getting close to the objects; even if the hijackers have their own transparent eyeguards, they inspire normally and can not get the objects by stopping respiration; in addition to this, hostages they get are unable to open their eyes but inspire the paralyzing gas under the condition that the hostages do not wear eyeguards 46 and oxygen masks 41, hence the ability of activity of the hostages nearly is zero, they can not do in pursuance of the instructions of the hijackers. All these unbeneficial conditions to the hijackers are advantageous to the security personnel in dealing with the event.

Therefore, by combination of the alarm devices 4 with the security device 23, the persons in the cockpit 49 can get alarm signals at the earliest moment; under the priority of consideration of the safety of flight, it is no necessity of worrying about that passengers will be treated in the same way as that to the hijackers, thereby the hijackers can be rapidly controlled by immediately activate the security device 23, this can avoid resistance from the hijackers that may hurt those innocents. Every one are possible to be considered as a suspect hijacker before arrestment, it is thereby necessary to let every one faint; after the security personnel do the arrestment, they help passengers to put on oxygen masks 41 to supply air individually to revive them, the passengers will not suffer the paralyzing gas for a long time. The flight may have to wait for landing, the paralyzing gas can only be cleared off by further processing of the ground staffs, and by virtue that the hoses 39 are limited by length, passengers can be advised to keep still without over operation and avoid to hinder dealing with the event.

When the alarm devices 4 are activated, the controllers in the cockpit 49 will immediately activate the security device 23, this may have to influence the physical as well as psychological states of the passengers and the schedule of the flight; thereby, the alarm devices 4 shall be prevented from activating at ones will unless in emergency. People shall be educated in general time. When the passengers board, flight attendants shall explain again the rules of using, and emphasize no unnecessary touch (on purpose or by accidence). Once the alarm devices 4 are activated, it is deemed as an alarm; if it is a lie to make this false alarm, criminal punishment shall be born and huge reparations shall be paid. The signal recorder 14 can tell which passengers at the recorded positions of chairs make the alarms, this can forbid those fond of making trick from trying touching, in this way, nearly each alarm can be a right alarm and credible.

The anti-hijack system and the anti-hijack method in a mode of forestalling the enemy of the present invention includes the following advantages:

1. In case of a hijack event, all the passengers in the passenger cabin are hostage, based on the spirit of mutual taking care the neighbors among all the interdependent passengers who are in the same airplane, the passengers naturally voluntarily want to be watchers, by the advantage of the plurality of the passengers over the hijackers who are scattered around, the passengers can rapidly advise the pilots in the cockpit to take an action at the earliest moment before the hijackers control the general situation.
2. The alarm devices are activated with slight actions, this can avoid irritating the hijackers and avoid immediate avenging of the hijackers.
3. At the same time the persons in the cockpit obtain the alarm signals, the cabin door of the cockpit will be automatically locked to prevent intruding of the hijackers.
4. The hijackers can be subdued in advance before the hijack event is formed; this can eliminate unnecessary damage, the range of damage can be reduced to the minimum degree.
5. The hijack event is rapidly eliminated before it is formed; this can thereby save waste of huge social cost.

In conclusion, the present invention is an anti-hijack system and an anti-hijack method in a mode of forestalling the enemy; it can effectively eliminate the influence on the safety of flight due to airplane hijack, and is surely a novel invention.

Having thus described my invention, what I claim as new and desire to be secured by Letters Patent of the United States are:

1. An anti-hijack system adapted to forestalling the enemy, said system comprises:
    an alarm system including a plurality of alarm devices each being a box with a plurality of switches therein and provided in cabins, a protective cover is provided in said box;
    a signal recorder provided in a cockpit, being connected with said alarm devices to record the positions where alarm signals emit;
    a displayer provided in said cockpit, being connected with said signal recorder to display said positions where alarm signals emit;
    a door lock provided in a cabin door of said cockpit, being connected with said signal recorder to be controlled by the latter;
    a security device having at least a container with paralyzing gas and tear gas therein, the outlet of said container is connected to a pipe communicated with said cabins; said pipe and said container have therebetween a switch of which a control push-button is provided in said cockpit; and
    an air supply connected to said cockpit via a delivery pipe, said delivery pipe is provided on the end thereof with a switch, while the upper end of said delivery pipe is provided with a cockpit manifold connected to said cockpit, said cockpit manifold is further provided with a passenger-cabin manifold having thereon a switch, a control push-button controlling said switch of said passenger-cabin manifold is provided in said cockpit.

2. The anti-hijack system adapted to forestalling the enemy as in claim 1, wherein, said alarm devices are mounted on armrests of every chair in a passenger cabin.

3. The anti-hijack system adapted to forestalling the enemy as in claim 2, wherein, each of said chairs is provided therein with a chair-back manifold of which an end is connected with said hidden pipe line network, the other end of said chair-back manifold is connected with a hose of which the other end is provided therein with a movable valve leaf.

4. The pipe line network as in claim 3, wherein, air is supplied for persons in said cockpit by said pipe line network rather than is supplied by oxygen bottles except when being required for security personnel in arrestment, for the purpose that said oxygen bottles are not seized by hijackers, and time for supplying air has no limitation.

5. The anti-hijack system adapted to forestalling the enemy as in claim 3, wherein, said hose connected with said chair-back manifold has a length only for use by a person during seating still.

6. The anti-hijack system adapted to forestalling the enemy as in claim 2, wherein, each of said chairs in said passenger cabin is provided with an eyeguard not light transmissible and an oxygen mask; for the sake of personal sanitation, said eyeguard sand said oxygen mask are both simple and disposable, and all said eyeguards and oxygen masks are distributed to passengers when in boarding, said passengers connect said oxygen masks to a hidden pipe line network for use by themselves.

7. The anti-hijack system adapted to forestalling the enemy as in claim 1, wherein said alarm devices are distributed at spaces in a passenger cabin of which each allowing a person to be put in motion at will.

8. The anti-hijack system adapted to forestalling the enemy as in claim 1, wherein, said switch on said delivery pipe of said air supply is opened normally, and is linked in a contrary but synchronic moving mode with said switch of said security device, said switch of said security device is closed normally.

9. The anti-hijack system adapted to forestalling the enemy as in claim 1, wherein, said cockpit manifold of said air supply is connected with a hidden pipe line network.

10. The pipe line network as in claim 9, wherein, the air supplied by said pipe line network is different from conventional rescue oxygen, rather, it is air made by an air conditioner; time of supplying air has no limitation, and no additional storage space and cost are needed for such air supplying.

11. The anti-hijack system adapted to forestalling the enemy as in claim 9, wherein, each of said chairs is provided therein with a chair-back manifold of which an end is connected with said hidden pipe line network, the other end of said chair-back manifold is connected with a hose of which the other end is provided therein with a movable valve leaf.

12. The anti-hijack system adapted to forestalling the enemy as in claim 11, wherein, said hose connected with said chair-back manifold has a length only for use by a person during seating still.

13. The pipe line network as in claim 9, wherein, air is supplied for persons in said cockpit by said pipe line network rather than is supplied by oxygen bottles except when being required for security personnel in arrestment, for the purpose that said oxygen bottles are not seized by hijackers, sand time for supplying air has no limitation.

14. The pipeline network as in claim 1, wherein, air is supplied for persons in said cockpit by said pipe line network rather than is supplied by oxygen bottles except when being required for security personnel in arrestment, for the purpose that said oxygen bottles are not seized by hijackers, and time for supplying air has no limitation.

15. The anti-hijack system adapted to forestalling the enemy as in claim 1, wherein, said protective cover provided on a surface of each of said alarm devices being a box with said switches therein is closed normally by pushing of springs in an upper and a lower channel.

16. The anti-hijack system adapted to forestalling the enemy as in claim 1, wherein, said protective cover of each of said alarm devices is provided with a direction indicating mark and a concaved surficial area for pressing.

17. The anti-hijack system adapted to forestalling the enemy as in claim 1, wherein, said switches of each of said alarm devices include a photosensitive switch and a snap switch.

18. The anti-hijack system adapted to forestalling the enemy as in claim 1, wherein, said door lock is a magnetic spring lock.

* * * * *